United States Patent
Halliday et al.

(10) Patent No.: US 8,793,579 B2
(45) Date of Patent: Jul. 29, 2014

(54) GRAPHICAL USER INTERFACES FOR SUPPORTING COLLABORATIVE GENERATION OF LIFE STORIES

(75) Inventors: Andrew Halliday, Soquel, CA (US); Christopher Lunt, Mountain View, CA (US)

(73) Assignee: Google Inc., Mountain View, CA (US)

(*) Notice: Subject to any disclaimer, the term of this patent is extended or adjusted under 35 U.S.C. 154(b) by 742 days.

(21) Appl. No.: 11/383,112

(22) Filed: May 12, 2006

(65) Prior Publication Data

US 2007/0250791 A1      Oct. 25, 2007

Related U.S. Application Data

(60) Provisional application No. 60/745,231, filed on Apr. 20, 2006.

(51) Int. Cl.

| | |
|---|---|
| *G06F 3/048* | (2013.01) |
| *G06F 17/30* | (2006.01) |
| *G06F 3/0481* | (2013.01) |
| *G06F 3/01* | (2006.01) |
| *G06Q 10/06* | (2012.01) |
| *G06Q 10/10* | (2012.01) |
| *G06Q 50/00* | (2012.01) |
| *H04L 29/08* | (2006.01) |
| *H04L 12/58* | (2006.01) |

(52) U.S. Cl.
CPC .... *G06F 17/30064* (2013.01); *G06F 17/30551* (2013.01); *G06F 3/048* (2013.01); *G06F 3/0481* (2013.01); *G06F 3/01* (2013.01); *G06Q 10/06* (2013.01); *G06Q 10/10* (2013.01); *G06Q 10/109* (2013.01); *G06Q 50/01* (2013.01); *H04L 67/22* (2013.01); *H04L 67/306* (2013.01); *H04L 51/32* (2013.01)
USPC ............................ 715/711; 715/751; 705/319

(58) Field of Classification Search
CPC ......... G06F 3/01; G06F 3/048; G06F 3/0481; G06F 17/30064; G06F 17/30551; H04L 51/32; H04L 67/306; H04L 67/22; G06Q 50/01; G06Q 10/109; G06Q 10/10; G06Q 10/06
USPC ................................... 715/711, 751; 705/319
See application file for complete search history.

(56) References Cited

U.S. PATENT DOCUMENTS 5,157,768 A * 10/1992 Hoeber et al. ................. 715/711
5,287,448 A *  2/1994 Nicol et al. .................... 715/707

(Continued)

FOREIGN PATENT DOCUMENTS

WO      WO 2006/098588 A1       9/2006

OTHER PUBLICATIONS

"Today, someone needs you. Tomorrow . . . you may need someone too," http://www.wisdomlegacy.org/HeresHowItWorks.aspx, Mar. 17, 2006.

(Continued)

*Primary Examiner* — Patrick Riegler
(74) *Attorney, Agent, or Firm* — Martine Penilla Group LLP

(57) ABSTRACT

Graphical user interfaces (GUIs) support the collaborative generation of life stories by helping the user view the development of the life stories of other users and facilitating interaction with them through these GUIs. A GUI according to a first type helps the user keep track of recent life stories and comments posted by other users of the collaborative system, and a GUI according to a second type helps the user view life stories of any user in a chronological manner.

25 Claims, 10 Drawing Sheets

(56) References Cited

U.S. PATENT DOCUMENTS

| | | | |
|---|---|---|---|
| 5,465,378 A | 11/1995 | Duensing et al. | |
| 5,819,032 A * | 10/1998 | de Vries et al. | 709/250 |
| 5,850,219 A | 12/1998 | Kumomura | |
| 5,913,212 A | 6/1999 | Sutcliffe et al. | |
| 5,923,325 A * | 7/1999 | Barber et al. | 715/711 |
| 5,938,724 A | 8/1999 | Pommier et al. | |
| 6,026,148 A | 2/2000 | Dworkin et al. | |
| 6,230,324 B1 | 5/2001 | Tomita et al. | |
| 6,340,978 B1 * | 1/2002 | Mindrum | 715/764 |
| 6,405,197 B2 | 6/2002 | Gilmour | |
| 6,694,302 B2 | 2/2004 | Chuang et al. | |
| 6,701,322 B1 | 3/2004 | Green | |
| 6,760,884 B1 * | 7/2004 | Vertelney et al. | 715/202 |
| 6,803,925 B2 | 10/2004 | Vronay | |
| 6,848,077 B1 | 1/2005 | McBrearty et al. | |
| 6,874,126 B1 * | 3/2005 | Lapidous | 715/711 |
| 6,901,379 B1 * | 5/2005 | Balter et al. | 705/27.2 |
| 6,976,229 B1 * | 12/2005 | Balabanovic et al. | 715/838 |
| 6,996,782 B2 * | 2/2006 | Parker et al. | 715/764 |
| 7,194,411 B2 * | 3/2007 | Slotznick et al. | 704/271 |
| 7,213,206 B2 | 5/2007 | Fogg | |
| 7,284,191 B2 | 10/2007 | Grefenstette et al. | |
| 7,287,225 B2 * | 10/2007 | Mindrum | 715/716 |
| 7,305,436 B2 | 12/2007 | Willis | |
| 7,321,883 B1 | 1/2008 | Freedy et al. | |
| 7,337,172 B2 | 2/2008 | Shapiro | |
| 7,366,759 B2 | 4/2008 | Trevithick et al. | |
| 7,421,449 B2 * | 9/2008 | Williams et al. | 1/1 |
| 7,424,669 B2 | 9/2008 | Bhogal et al. | |
| 7,506,262 B2 * | 3/2009 | Gupta et al. | 715/751 |
| 7,558,853 B2 | 7/2009 | Alcorn et al. | |
| 7,567,977 B1 | 7/2009 | White | |
| 7,725,492 B2 | 5/2010 | Sittig et al. | |
| 7,810,021 B2 | 10/2010 | Paxson | |
| 8,099,433 B2 | 1/2012 | Sittig et al. | |
| 2001/0047373 A1 | 11/2001 | Jones et al. | |
| 2002/0052768 A1 | 5/2002 | Walker et al. | |
| 2002/0103822 A1 * | 8/2002 | Miller | 707/501.1 |
| 2002/0152245 A1 | 10/2002 | McCaskey et al. | |
| 2002/0169769 A1 | 11/2002 | Jackson | |
| 2002/0178185 A1 | 11/2002 | Kuchinsky et al. | |
| 2003/0046318 A1 | 3/2003 | Schohn et al. | |
| 2003/0055871 A1 | 3/2003 | Roses | |
| 2004/0143603 A1 | 7/2004 | Kaufmann et al. | |
| 2004/0153445 A1 * | 8/2004 | Horvitz et al. | 707/3 |
| 2004/0194034 A1 | 9/2004 | Vlamis | |
| 2004/0199867 A1 | 10/2004 | Brandenborg | |
| 2005/0055625 A1 * | 3/2005 | Kloss | 715/500.1 |
| 2005/0057584 A1 * | 3/2005 | Gruen et al. | 345/752 |
| 2005/0060166 A1 | 3/2005 | Durham et al. | |
| 2005/0182773 A1 | 8/2005 | Feinsmith | |
| 2005/0192913 A1 | 9/2005 | Lubart | |
| 2005/0193347 A1 * | 9/2005 | Van Dam | 715/764 |
| 2005/0197846 A1 | 9/2005 | Pezaris et al. | |
| 2005/0198031 A1 * | 9/2005 | Pezaris et al. | 707/9 |
| 2005/0203801 A1 | 9/2005 | Morgenstern et al. | |
| 2005/0209887 A1 | 9/2005 | Pollner | |
| 2005/0216768 A1 | 9/2005 | Eppert | |
| 2005/0235062 A1 | 10/2005 | Lunt et al. | |
| 2005/0268237 A1 * | 12/2005 | Crane et al. | 715/732 |
| 2005/0273378 A1 * | 12/2005 | MacDonald-Korth et al. | 705/10 |
| 2006/0064639 A1 | 3/2006 | Reid et al. | |
| 2006/0143043 A1 | 6/2006 | McCallie et al. | |
| 2006/0155757 A1 * | 7/2006 | Williams et al. | 707/103 R |
| 2006/0224967 A1 | 10/2006 | Marmaros | |
| 2006/0230061 A1 | 10/2006 | Sample et al. | |
| 2006/0242178 A1 * | 10/2006 | Butterfield et al. | 707/100 |
| 2006/0248086 A1 | 11/2006 | Pahud | |
| 2006/0250419 A1 * | 11/2006 | Shiba et al. | 345/619 |
| 2006/0253456 A1 * | 11/2006 | Pacholec et al. | 707/10 |
| 2006/0253491 A1 * | 11/2006 | Gokturk et al. | 707/104.1 |
| 2006/0277477 A1 * | 12/2006 | Christenson | 715/760 |
| 2006/0282306 A1 | 12/2006 | Thissen-Roe | |
| 2007/0016647 A1 | 1/2007 | Gupta et al. | |
| 2007/0019849 A1 | 1/2007 | Kaufman et al. | |
| 2007/0043688 A1 | 2/2007 | Kountz et al. | |
| 2007/0067268 A1 | 3/2007 | Dai et al. | |
| 2007/0089053 A1 | 4/2007 | Uhlig et al. | |
| 2007/0239761 A1 | 10/2007 | Baio et al. | |
| 2007/0250479 A1 | 10/2007 | Lunt | |
| 2007/0250496 A1 | 10/2007 | Halliday | |
| 2007/0250791 A1 | 10/2007 | Halliday et al. | |
| 2007/0260996 A1 | 11/2007 | Jakobson | |
| 2007/0261071 A1 | 11/2007 | Lunt | |
| 2008/0010585 A1 | 1/2008 | Schneider et al. | |
| 2008/0120345 A1 | 5/2008 | Duncombe | |
| 2008/0320547 A1 | 12/2008 | Lupoi et al. | |
| 2009/0018867 A1 | 1/2009 | Reiner | |
| 2010/0174675 A1 | 7/2010 | Mons et al. | |
| 2011/0022966 A1 | 1/2011 | Rose et al. | |
| 2012/0096037 A1 | 4/2012 | Sittig et al. | |
| 2012/0096038 A1 | 4/2012 | Sittig et al. | |

OTHER PUBLICATIONS

"WebBiographies.com Enables People to Document Their Lives and Build Dynamic Family Trees," http://www.lexdon.com/article/Web-Biographies.com_Enables_People_to_Document/45013.html, Apr. 18, 2006.

Radev et al; Ranking Suspected Answers to Natural Language Questions Using Predictive Annotation; Google; 2002; pp. 150-157.

Xu et al; Evaluation of an Extraction-Based Approach to Answering Definitional Questions; ACM; 2004; pp. 418-424.

Jones; A Biographic Researcher in Pursuit of an Aesthetic: The User of Art-Based (re) Presentations in "Performative" Dissemination of Life Stories; Google; Apr. 2006; pp. 66-85.

Benford et al.; Designing Storytelling Technologies to Encourage Collaboration Between Young Children; ACM; 2000; pp. 556-573.

Mazalek et al; Tangible View Points: A Physical Approach to Multimedia Stories; ACM; 2002; pp. 153-160.

U.S. Appl. No. 11/415,691, filed May 2, 2006; Christopher Lung; Notice of Allowance issued Oct. 11, 2011.

U.S. Appl. No. 11/415,691, filed May 2, 2006; Christopher Lung; Notice of Allowance issued Sep. 20, 2011.

Marrs et al; Just-in-Time Teaching in Biology: Creating an Active Learner Classroom Using the Internet; Cell Biology Education; 2004; pp. 49-61 vol. 3.

Ellis et al; Designing Palaver Tree Online: Supporting Social Roles in a Community of Oral History; CHI; Apr.-Mar. 2001; pp. 474-481; vol. 3, Issue 1.

Brush et al., "Notification for Shared Annotation of Digital Documents," Apr. 2002, pp. 89-96.

U.S. Appl. No. 11/415,691, filed May 2, 2006; Christopher Lunt; Office Action issued Aug. 4, 2009.

U.S. Appl. No. 11/415,691, filed May 2, 2006; Christopher Lunt; Office Action issued May 19, 2011.

U.S. Appl. No. 11/383,123, filed May 12, 2006; Andrew Halliday; Office Action issued Sep. 15, 2009.

U.S. Appl. No. 11/383,123, filed May 12, 2006; Andrew Halliday; Office Action issued Aug. 24, 2011.

U.S. Appl. No. 11/383,123, filed May 12, 2006; Andrew Halliday; Office Action issued Mar. 9, 2012.

U.S. Appl. No. 11/383,123, filed May 12, 2006; Andrew Halliday; Office Action issued Aug. 17, 2012.

U.S. Appl. No. 11/383,134, filed May 12, 2006; Christopher Lunt; Office Action issued Sep. 17, 2009.

U.S. Appl. No. 11/383,134, filed May 12, 2006; Christopher Lunt; Office Action issued Aug. 24, 2011.

* cited by examiner

GRAPHICAL USER INTERFACES FOR SUPPORTING COLLABORATIVE GENERATION OF LIFE STORIES

CROSS-REFERENCE TO RELATED APPLICATION

This application claims the benefit of U.S. Provisional Patent Application Ser. No. 60/745,231, entitled "Collaborative System and Method for Generating Biographical Accounts," filed Apr. 20, 2006, which is herein incorporated by reference.

BACKGROUND OF THE INVENTION

1. Field of the Invention

The present invention relates generally to systems and methods for recording life stories and, more particularly, to systems and methods that support the collaborative generation of life stories.

2. Description of the Related Art

Flickr™ is a popular photo sharing service that is accessible over the Internet. It employs various graphical user interfaces (GUIs) to display photos uploaded by users of its service. On the home page of a user, a collection of photos that have been recently uploaded by users of the service is displayed as thumbnail images. The service also provides its users with some flexibility to personalize their home pages. For example, users can custom define groups and a section on the home page displays the thumbnail images of the most recent photos that have been recently uploaded by the users in that group. A click on any thumbnail image hyperlinks the user to a web page that provides a larger image of the photo, additional information about the photo, and a text window for inputting any comments.

Another GUI of the Flickr™ service helps users to customize the display of their photo collections according to set time periods. FIG. 1 is a schematic illustration of such a GUI. The GUI includes a display section 110 for displaying thumbnail images, a chronology bar 120, left and right controls 130, 140 for the chronology bar, and a plurality of boxes 150 underneath the chronology bar. The chronology bar 120 is displayed with dates that range from the earliest date of the photo collection to the latest date of the photo collection. As a default, thumbnail images of all photos in the collection are displayed in the display section 110. The left and right controls 130, 140 may be moved left and right using a pointing device so as to contract the date range of the photos that are displayed in the display section 110. In response to the movement of the left and right controls 130, 140, the display section 110 is updated so that only the photos with dates within the modified date range are displayed therein. A click on any thumbnail image inside the display section 110 hyperlinks the user to a web page that provides a larger image of the photo, additional information about the photo, and text windows for editing the photo title, tags, and description. Each of the boxes 150 represents graphically the number of photos for the date range that is spanned by the width of the box. More photos are represented by taller boxes. Also, when the user moves the cursor of the pointing device over a box 150, the number of photos for the date range that is spanned by the width of that box becomes displayed inside the box.

The GUIs described above facilitate the process of sharing photos and organizing them into collections, but they do not, and fundamentally cannot, support the collaborative generation of life stories, which include text narratives of events in addition to photos representative of the events. Also, the GUIs that are employed in web-based life story collection systems generally are configured to facilitate user-to-system interactions and do not support the collaborative generation of life stories.

SUMMARY OF THE INVENTION

The present invention provides tools for supporting a collaborative system and method for generating life stories. These tools are embodied in GUIs that encourage and promote the collaborative generation of life stories.

A GUI according to an embodiment of the invention displays to a user the thumbnail images corresponding to the most recent life stories and comments that have been submitted by other users, so that the user can see their most recent activities with a glance. Only the thumbnail images are initially displayed on the GUI, but when the user positions a mouse pointer on top of a thumbnail image, textual information is displayed to the user, including the name or user ID of the person posting the life story or comment and the title of the life story or comment. Excerpts from the text narrative of the life story or comment may also be displayed. A click on any of thumbnail images hyperlinks the user to a web page that displays the thread containing the life story or comment and provides hyperlinks to GUIs for adding comments to life stories or responding to comments.

A GUI according to another embodiment of the invention displays to a user a timeline with various GUI controls and thumbnail images or titles corresponding to any user's life stories having dates that are within the date range of the timeline. The thumbnail images or titles corresponding to life stories are positioned above the timeline in accordance with the dates of the life stories. In one embodiment, thumbnail images are displayed on the GUI, but when the user positions a mouse pointer on top of a thumbnail image, the title of the life story and/or excerpts from the text narrative of the life story are displayed to the user. A click on any thumbnail image hyperlinks the user to a web page that displays the thread containing the life story and provides hyperlinks to GUIs for adding comments to life stories or responding to comments. In another embodiment, titles are displayed on the GUI, but when the user positions a mouse pointer on top of a title, the thumbnail image of the life story corresponding to that title is also displayed to the user. A click on the title hyperlinks the user to a web page that displays the thread containing the life story and provides hyperlinks to GUIs for adding comments to life stories or responding to comments.

With the GUIs according to embodiments of the invention, a user can easily keep track of activities of other users and make comments to their life stories or respond to their comments. Also, the user can easily view the chronology of life stories posted by any user and make comments to such user's life stories or ask questions about a particular time in such user's life history.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
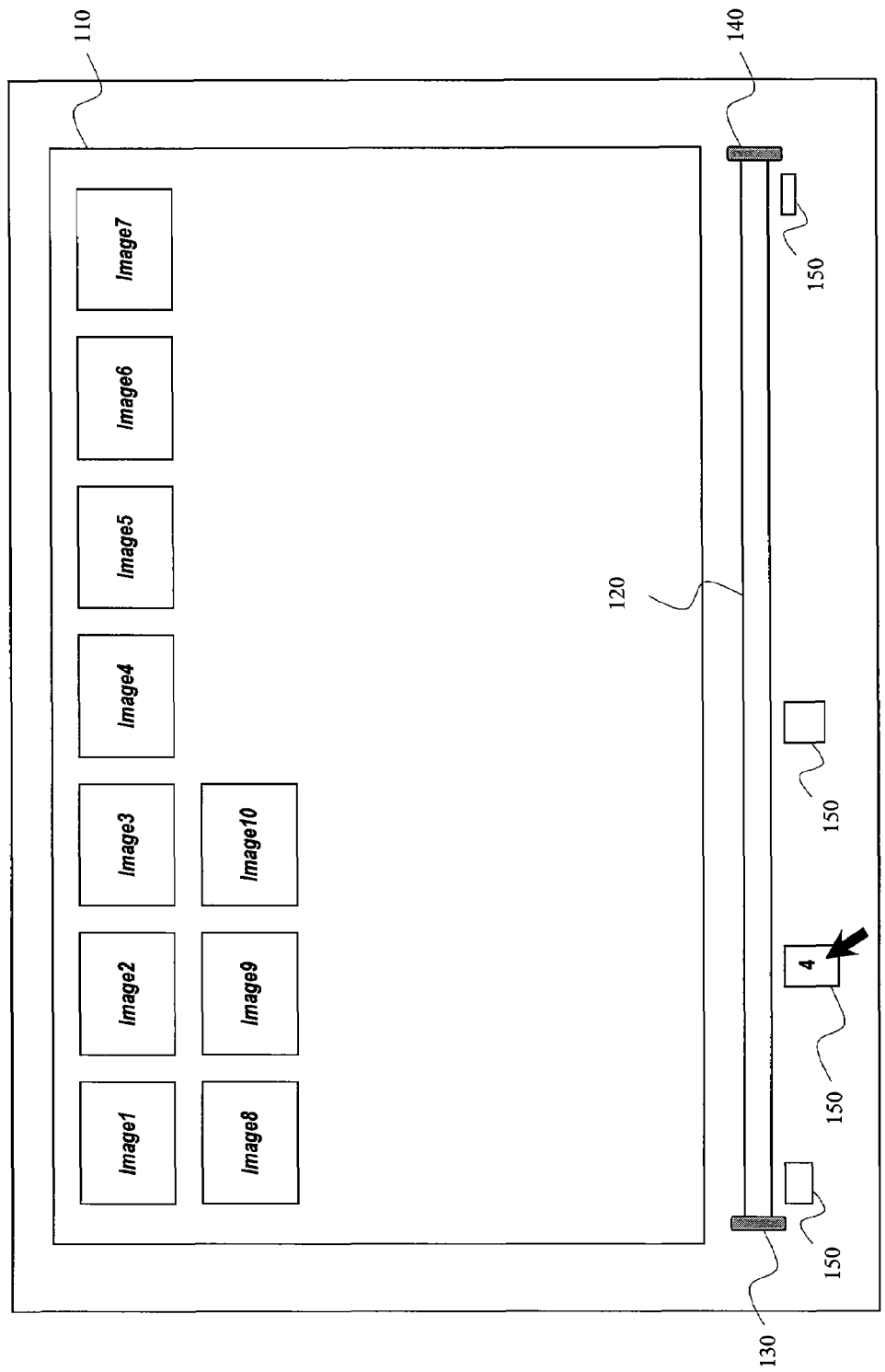
FIG. 1 is a schematic representation of a prior art GUI.
Figure 2:
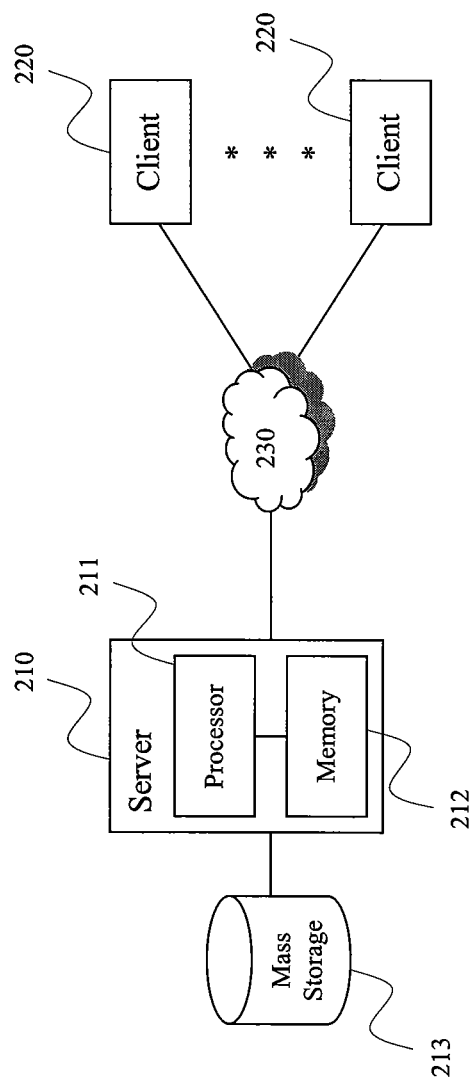
FIG. 2 illustrates a networked computer environment in which systems and methods according to embodiments of the present invention may be implemented.

FIG. 2 illustrates a networked computer environment in which systems and methods according to embodiments of the present invention may be implemented. As shown, the networked computer environment includes a server computer 210 and a plurality of client computers 220 (only two of which are shown). The server computer 210 and the client computers 220 are connected over a computer network 230, e.g., the Internet. The components of the server computer 210 that are illustrated in FIG. 2 include a processor 211 and a system memory 212. The server computer 210 is connected to a mass storage unit 213 that stores the contents managed by the server computer 210. Each client computer 220 includes conventional components of a computing device, e.g., a processor, system memory, a hard disk drive, input devices such as a mouse and a keyboard, and output devices such as a monitor (not shown).

The server computer 210 is programmed to operate as a network server that communicates with the client computers 220. In the embodiments of the present invention described herein, the server computer 210 is programmed as a web server that communicates with the client computers 220 using the TCP/IP protocol, and hosts a web site that can be accessed by the client computers 220. The client computers 220 are programmed to execute web browser programs and access the web pages managed by the server computer 210 by specifying a uniform resource locator (URL) for the server computer 210 into the browser.

The server computer 210 manages the contents stored in the mass storage unit 213 using a relational database software. The contents include profile data of the registered users of the web site. The profile data specify: user ID, password, name, e-mail, address including zip code, gender, marital status, date of birth, occupation, a pointer to an image file, various permission settings, and other similar data. The contents further include interview questions, multimedia files such as image files, video files, audio files and flash animation files, life stories posted by the users, commentaries made to the posted life stories, user-defined private circle data, and such other data needed by the server computer 210 to process data received from the users and render web pages requested by the users.

In the embodiments of the present invention described below, users are respectively operating the client computers 220 that are connected to the server computer 210 over the Internet. Also, web pages that are displayed to a user are transmitted from the server computer 210 to that user's client computer 220 and processed by the web browser program stored in that user's client computer 220 for display through the monitor of that user's client computer 220.

Figure 3A:
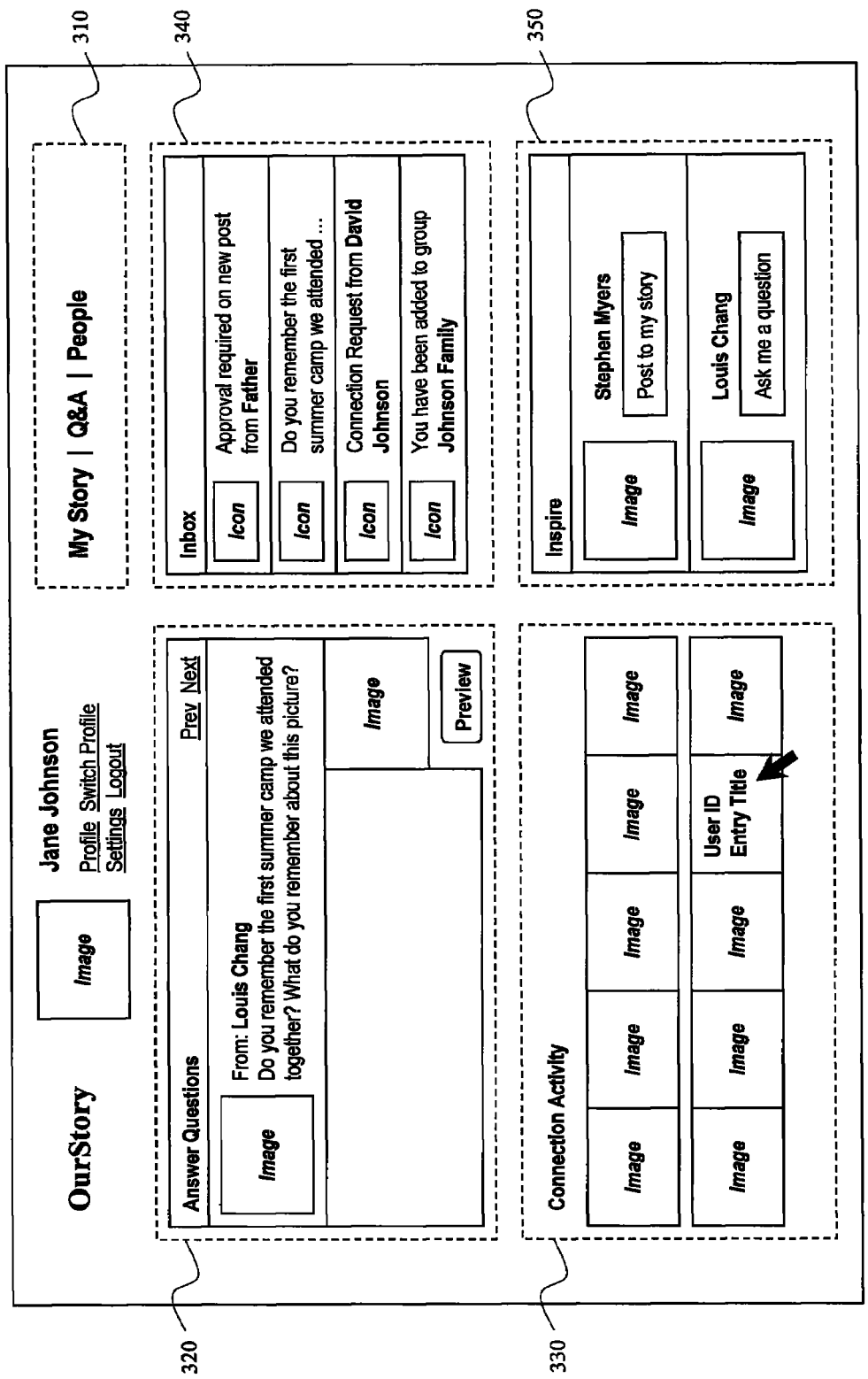
FIG. 3A is a schematic representation of a sample web page that includes a GUI according to a first embodiment of the present invention.

FIG. 3A is a schematic representation of a web page that is generated by the server computer 310 and transmitted to a user for display when the user accesses the web site managed by the server computer 310, and logs in using his or her user ID and password. The web page identifies the web site "OurStory" and the user who logged in with the user's name (Jane Johnson) and the user's image. The user can access her life stories by accessing the My Story hyperlink provided in a navigation section 310 of the web page. Other hyperlinks are provided on the web page to allow the user to view and change her profile (Profile hyperlink) and the account settings (Settings hyperlink).

The web site permits a single registered user to keep multiple profiles and maintain life stories for each person, group, and sometimes fictional characters, represented in the profiles. This feature may be used in situations where it is preferred to write the life stories from a third person point of view, or for a group of people (e.g., the Smith family or the 1980 U.S. Olympic hockey team) or a fictional character, or where the subject of the life stories is not computer savvy. The Switch Profile hyperlink is provided to users who are maintaining multiple profiles to allow such users to switch to another profile and view and manage the life stories of the person, group, or fictional character represented in the other profile.

The web page further provides various other graphical user interface (GUI) elements. They include a navigation section 310, a question section 320, an image gallery 330, an inbox 340, and a collaboration section 350.

The navigation section 310 includes hyperlinks to web pages that are used to view, modify or add to the user's life stories (My Story), interview questions (Q&A), and relationships (People).

The question section 320 displays the most recent question that has been posed to the user and various other information associated with the question, including the name and image of the person asking the question, any image attached to the question by the person, and a text input field in which the user can answer the question. The question section 320 also provides question navigation hyperlinks "Previous" and "Next" using which the user can turn to the previous question or the next question that is in the queue of questions that have been posed to this user. The input of the answer followed by a click on the Preview button causes the display of a preview web page, using which the user can either publish the answer as a life story or cancel it. If the user publishes the answer, the server computer 210 saves the answer and the associated image in the mass storage unit 213. Further, in response to either the publishing or canceling action, the next question in the queue is displayed to the user. The user may also delete a question from the queue of questions by clicking on the "Delete" hyperlink. In response to this action, the next question in the queue is displayed to the user.

The image gallery 330 represents the GUI according to a first embodiment of the present invention. It provides the user with a pictorial snapshot of the more recent activities by other users who are connected to the user or by those who belong to a special group defined by the user, e.g., the user's immediate family or the user's closest friends. For simplicity in the following description, these other users will be referred to as connected users. The activities that are tracked by the image gallery 330 include recent posts of life stories by the connected users and recent comments made by them to the user's life stories.

In the example of the image gallery 330 shown in FIG. 3A, two rows of interactive regions for thumbnail images are displayed to the user. The top row corresponds to the most recent posts of life stories by connected users. The bottom row corresponds to the most recent comments that connected users have made to the user's life stories. When images are not available, the textual information corresponding to a life story or comment is displayed instead. When the user positions a mouse pointer on top of a thumbnail image, textual information of the life story corresponding to that thumbnail image is displayed. The textual information may be the name or user ID of the user who posted the life story or comment and the title of the life story or comment. Excerpts of the text narrative of the life story may also be displayed. The display order of the thumbnail image is determined based on how recent the life story or comment was posted, with the most recent posts being displayed on the left and less recent ones to the right thereof. A click on any interactive region hyperlinks the user to the thread corresponding to that region. A "thread" consists of a post and any comments made concerning the post. The user can input his or her comments to another user's life story or respond to another user's comments upon viewing the thread and accessing a hyperlink that is provided for such inputs.

Figure 3B:
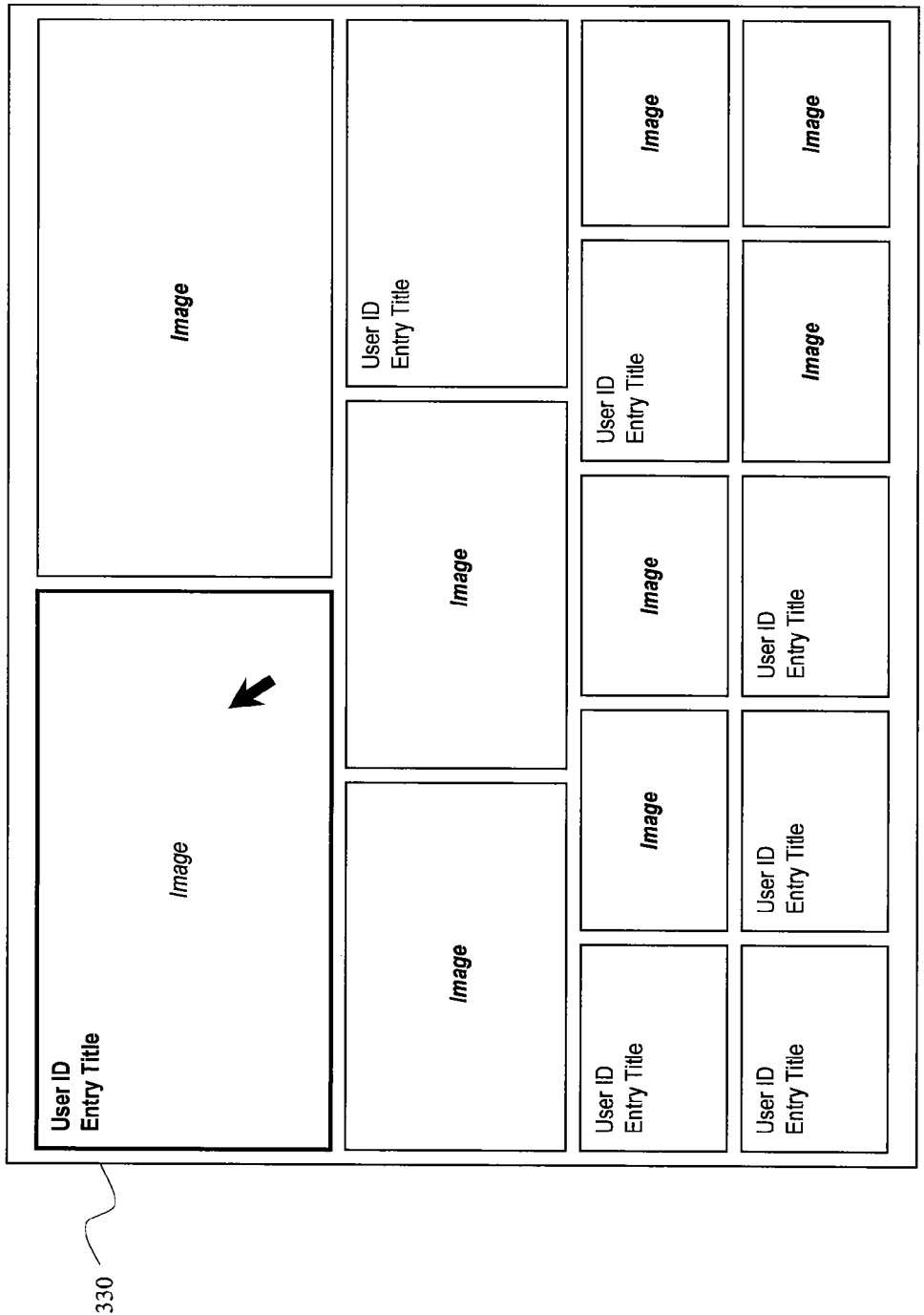
FIG. 3B illustrates another GUI according to a first embodiment of the present invention.

In the example of the image gallery 330 shown in FIG. 3B, four rows of interactive regions for thumbnail images are displayed to the user. The topmost row is the tallest and two interactive regions are provided in that row. The second row from the top is the next tallest and three interactive regions are provided in that row. The third and fourth rows from the top are of the same height. They are the shortest of the four rows and five interactive regions are provided in each of these rows. When images are not available, the textual information corresponding to a life story or comment is displayed instead. The top-left region corresponds to the most recent life story or comment posted by a connected user. The top-right region corresponds to the next most recent life story or comment posted by a connected user. The leftmost region in the second row corresponds to the next most recent life story or comment posted by a connected user, and so forth. When the user positions a mouse pointer on top of a thumbnail image, textual information of the life story corresponding to that thumbnail image is displayed and the image is partially masked. The textual information may be the name or user ID of the user who posted the life story or comment and the title of the life story or comment. Excerpts of the text narrative of the life story may also be displayed. A click on any interactive region hyperlinks the user to the thread corresponding to that region. The user can input his or her comments to another user's life story or respond to another user's comments upon viewing the thread and accessing a hyperlink that is provided for such inputs.

The image gallery 330 may also include thumbnail images of additional categories of posts. A third category of posts may be those that do not necessarily depict a life story but are instructional, informational, or inspirational in nature. A fourth category of posts may be those that are system generated to encourage users to post their life stories.

When the web page that includes the image gallery 330 is loaded from the server computer 210, the data necessary to generate the image gallery 330 may be retrieved synchronously with (i.e., at the time of) the request for the web page including the image gallery 330. The synchronous loading method is described in conjunction with FIG. 5A. If the retrieval time of the synchronous loading method, however, is expected to be too long, an asynchronous loading method described in conjunction with FIG. 5B may be used instead.

The image gallery 330 is populated with images or replacement text for a user with reference to the notification settings of the user. The account settings or the user profile may be used to specify this setting. The notification options include "E-mail Only" which means that the user will be notified through e-mail but not through the image gallery 330, "New Threads Only" which means that the user will be notified through e-mail and the image gallery 330 only when new threads are created by other users, and "Any Post" which means that the user will be notified through e-mail and the image gallery 330 of submissions of any posts and comments by other users who have connected to the user. The user also has the option of turning notification ON for individual threads.

The inbox 340 displays messages generated by the web site in response to actions taken by the other users of the web site. The messages include notices of actions taken by other users (e.g., "You have been added to group Johnson Family") and summaries of tasks that the user has been asked to complete (e.g., "Approval required on new post from Father" and "Connection Request from David Johnson"). An icon is displayed alongside each message to help the user quickly identify the content of the message.

The collaboration section 350 provides hyperlinks to a web page used to post a life story on behalf of another user and a web page used to ask questions to another user. The identity of the other user is displayed in this section along with that person's image. Only those users who have given the user sufficient access rights will appear in this section. In the example given here, Jane Johnson has the right to post stories on behalf of Stephen Myers, and Jane Johnson has the right to ask Louis Chang questions.

Figure 4A:
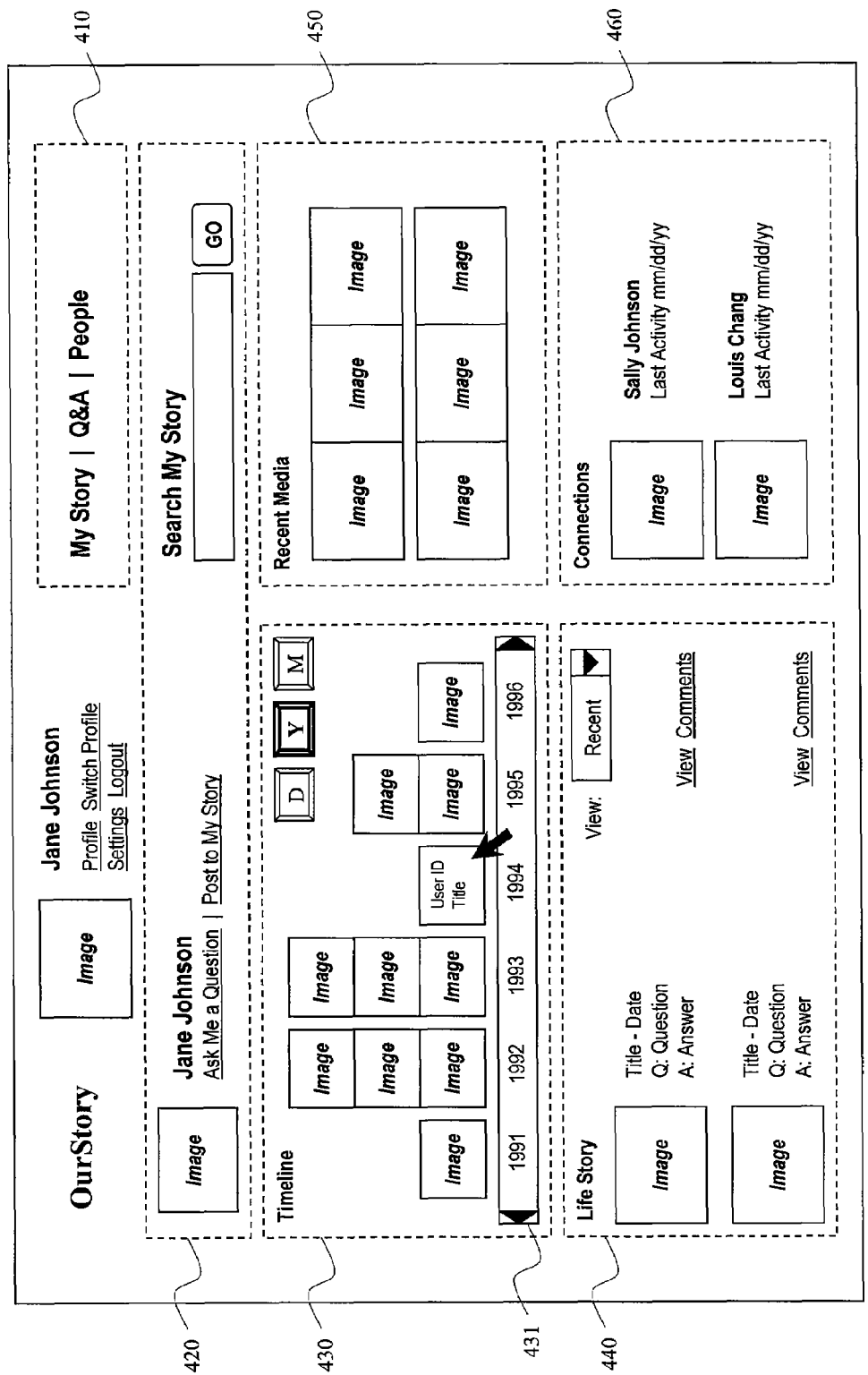
FIGS. 4A and 4B are schematic representations of sample web pages that include a GUI according to a second embodiment of the present invention.
Figure 4B:
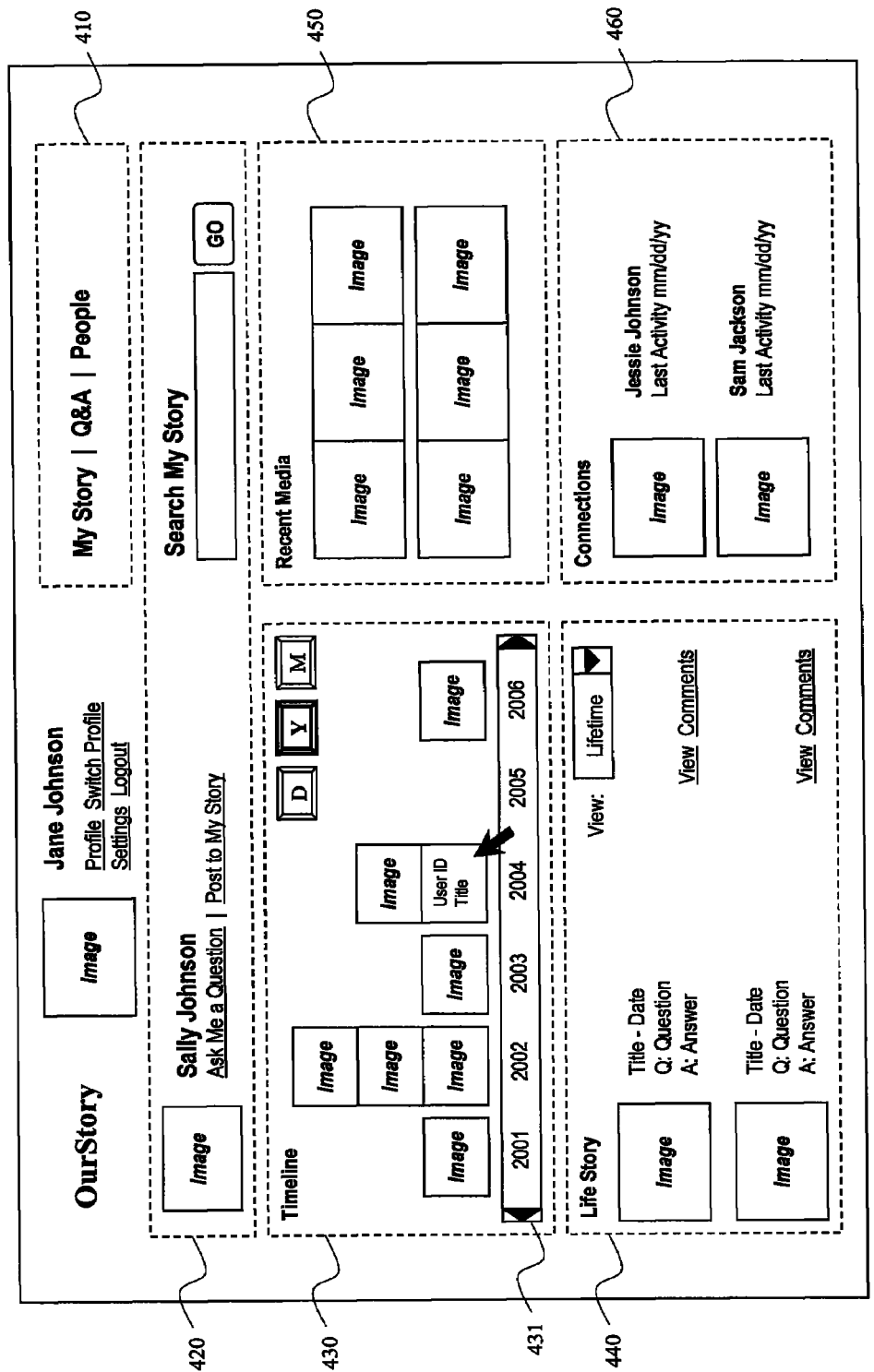

FIG. 4A is a schematic representation of the web page that is generated by the server computer 210 and transmitted to a user for display when the user selects the My Story hyperlink from the navigation section 310. FIG. 4B is a schematic representation of the web page that is generated by the server computer 210 and transmitted to a user for display when the user accesses the life stories of another user, Sally Johnson. Both web pages provide a navigation section 410 which functions in the same manner as the navigation section 310 of FIG. 3A. They also include a profile ID section 420, a timeline section 430, a life story section 440, a recent media section 450 and a connection section 460.

The profile ID section 420 identifies the person whose life stories are presented on this web page. The profile ID section 420 also includes hyperlinks to web pages for asking questions (Ask Me a Question) and for posting life stories (Post to My Story). A search feature is provided in this section as well.

The timeline section 430 represents the GUI according to a second embodiment of the present invention. It presents the user's life stories pictorially using images from life stories organized according to a chronology bar 431. All of the images appearing on top of a specified time period correspond to posts that describe events of that time period. When the user positions a mouse pointer on top of an image, textual information of the life story corresponding to that image is displayed. The textual information may be the name or user ID of the user who posted the life story or comment and the title of the life story or comment. Excerpts of the text narrative of the life story may also be displayed. When images are not available, the textual information corresponding to a life story or comment is displayed instead. A click on any image hyperlinks the user to the life story corresponding to that image. When viewing the life story of another user, the user can input his or her comments to the other user's life story upon viewing the life story and accessing a hyperlink that is provided for such inputs. When viewing the user's own life story, the user can edit his or her life story or respond to a comment made by another user upon viewing the life story and accessing a hyperlink that is provided for such inputs.

The range of time periods represented by the chronology bar 431 can be changed by clicking on the arrows at the ends of the chronology bar. Clicking on the left arrow moves the life stories back in time and clicking on the right arrow moves the life stories forward in time. The scale of the chronology bar 431 may also be changed using the button controls labeled as "D" for decade, "Y" for year, and "M" for month. As shown in FIG. 4A, the "Y" button has been selected and so the current scale is year.

Figure 4C:
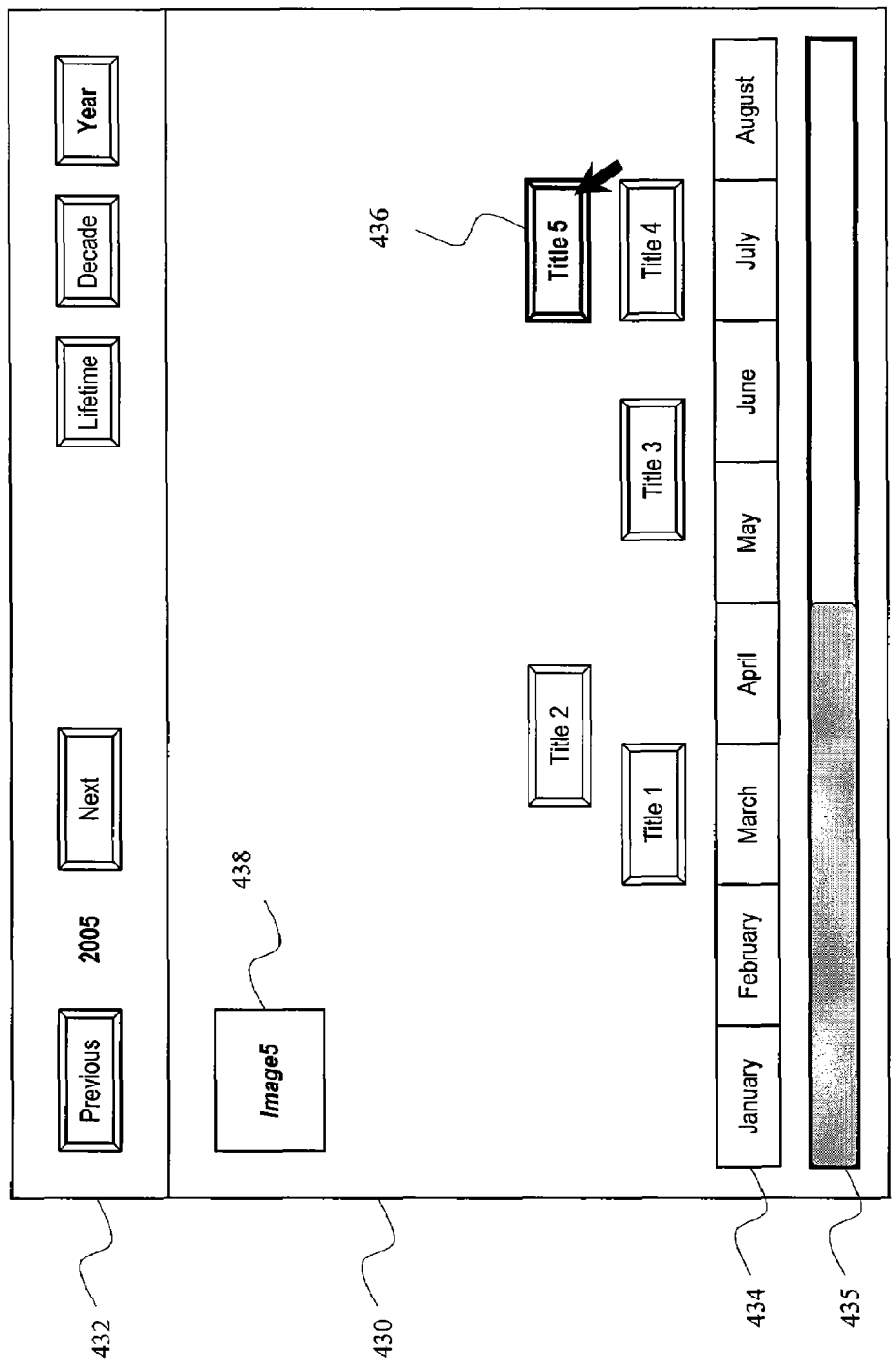
FIG. 4C illustrates another GUI according to a second embodiment of the present invention.

FIG. 4C is another example of the timeline section 430. This timeline section 430 includes a date control section 432, a chronology bar 434, a scroll bar 435 underneath the chronology bar 434, interactive regions 436 for displaying titles of life stories, and an image display region 438. The date range represented by the timeline section 430 is controlled by the date control section 432 and the scroll bar 435. As shown in FIG. 4C, the Year button has been selected in the date control section 432. Hence, the year is displayed in the date control section 432. The displayed year can be incremented by pressing the Next button or decremented by pressing the Previous button. Also, the months displayed in the chronology bar 434 can be changed by moving the scroll bar 435 to the left and right. In all cases, the interactive regions 436 for displaying titles of life stories are positioned in accordance with the dates entered for the life stories, and only those titles of life stories having dates within the date range defined by the chronology bar 434 are displayed. When the user positions a mouse pointer on top of an interactive region 436, the title of the life story corresponding to that region is highlighted and the image corresponding to that life story is displayed in the image display region 438. A click on any interactive region 436 hyperlinks the user to the life story corresponding to that region. When viewing the life story of another user, the user can input his or her comments to the other user's life story upon viewing the life story and accessing a hyperlink that is provided for such inputs. When viewing the user's own life story, the user can edit his or her life story or respond to a comment made by another user upon viewing the life story and accessing a hyperlink that is provided for such inputs.

Upon viewing the timeline section 430 of another user, the user may ask the other user a question using the Ask Me a Question hyperlink. The user might do this because an event that was commonly experienced by the two users is not represented in the timeline section 430, or the user is curious about the events in a particular time period, e.g., childhood, of the other user and finds that there very few life stories for that time period.

The life story section 440 provides a display of the life stories of the user. Each life story normally includes a title, the date of the event depicted in the life story, a word account of the event, and an image representative of the event. If a question asked by another user prompted the posting of a life story, the question is also displayed. A life story can be viewed and edited by clicking on the View hyperlink. A life story thread including comments made to the life story can be viewed by clicking on the Comments hyperlink. The life stories shown in the display field are sorted based on the selection made using the View drop-down menu. The available selections include: "Recent" which sorts the life stories chronologically by the event date; "Recent" which sorts the life stories chronologically by the posting date; "Location" which sorts the life stories according to the event location; and "People" which sorts the life stories according to the people depicted in the life stories.

The recent media section 450 includes recent images that have been attached to posts and comments by the user. It provides a snapshot of the user's recent activities at the web site. A click on any image causes the thread containing the image to be displayed.

The connection section 460 provides a list of connected users and the date of their most recent activity at the web site. A click on the name or image of any connected user causes the My Story web page of that user to be displayed.

Figure 5A:
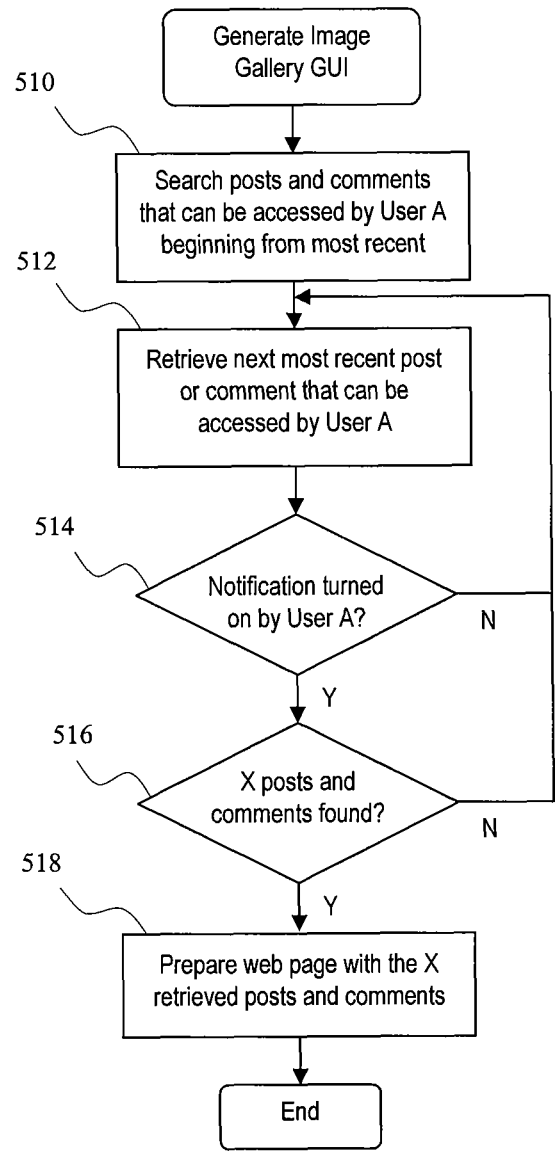
FIG. 5A is a flow diagram that illustrates a synchronous method carried out by the server computer to generate the GUI according to a first embodiment of the present invention.

FIG. 5A is a flow diagram that illustrates a synchronous method carried out by the server computer 210 to generate the GUI according to a first embodiment of the present invention. In the example given herein, the web page that includes the image gallery 330 is being prepared by the server computer 210 for transmission to the client computer 220 of User A, and the data necessary to generate the image gallery 330 is retrieved synchronously with (i.e., at the time of) the request made by the client computer 220 of User A for the web page including the image gallery 330.

In step 510, the server computer 210 begins search of the posts and comments that can be accessed by User A beginning from the most recent. The posts and comments that can be accessed by User A include those post and comments that are submitted by those users who have connected to User A. The posts and comments are examined one by one in the loop defined by steps 512-516. In step 512, the next most recent post or comment that can be accessed by User A is retrieved for examination. If notification has been turned ON by User A for the thread containing the retrieved post or comment (i.e., if any of the following applies: (i) User A has turned notification ON for any post; (ii) User A has turned notification ON for new threads and this particular thread is a new thread; and (iii) User A has turned notification ON for this particular thread), the flow proceeds to step 516. In step 516, a check is made to see if a predetermined number of post or comments has been retrieved (e.g., X=13). If so, the web page containing the image gallery 330 is prepared with the X retrieved posts and comments. If the condition in either step 514 or 516 is false, the flow returns to step 512 where the next most recent post or comment that is readable by User A is retrieved for examination.

The flow diagram of FIG. 5A represents the synchronous method for generating the image gallery 330 shown in FIG. 3B. It can be modified so that it represents the synchronous method for generating the image gallery 330 shown in FIG. 3A, by searching for and retrieving X1 (e.g., X1=5) most recent posts and X2 (e.g., X2=5) most recent comments.

Figure 5B:
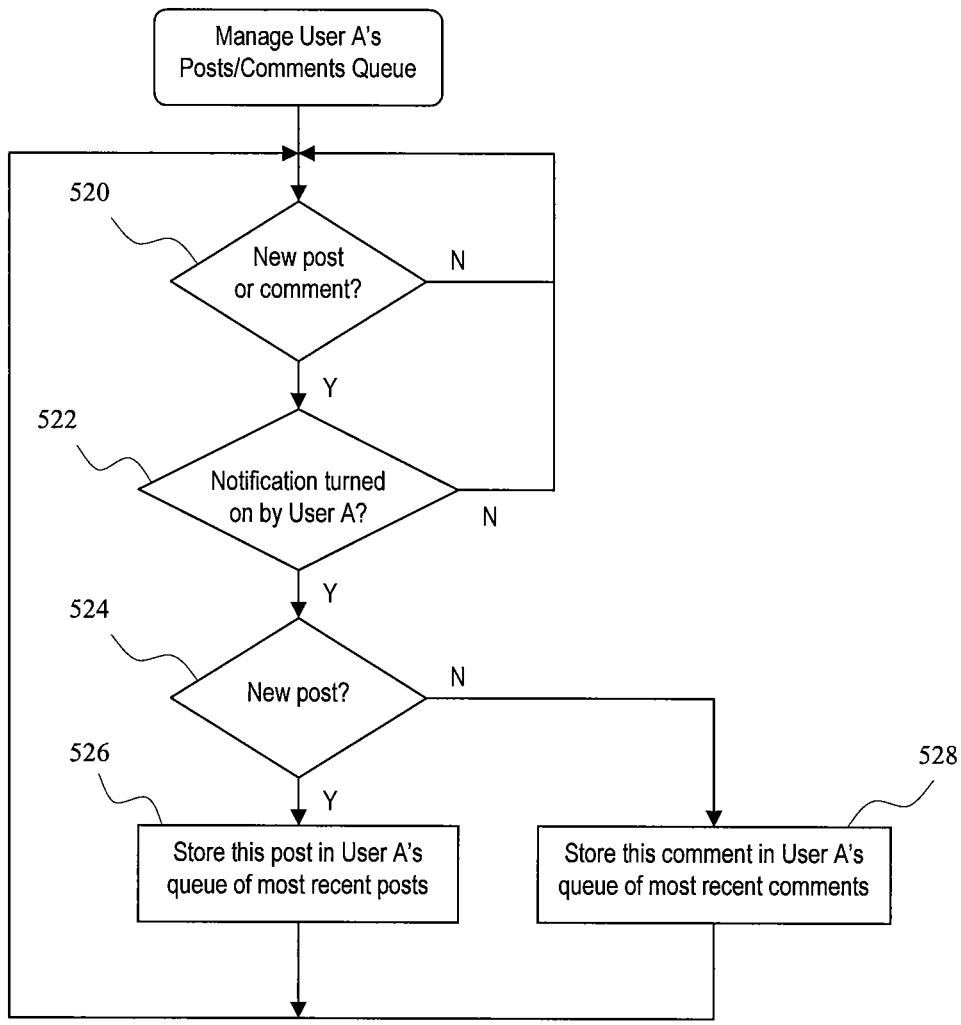
FIG. 5B is a flow diagram that illustrates an asynchronous method carried out by the server computer to generate the GUI according to a first embodiment of the present invention.

The method illustrated in the flow diagram of FIG. 5B sets forth steps carried out by the server computer 210 to prepare the data necessary to generate the image gallery 330 in an asynchronous manner. In the example given herein, the data necessary to generate the image gallery 330 shown in FIG. 3A is prepared prior to the request made by the client computer 220 of User A for the web page including the image gallery 330 so that the requested web page can be loaded quickly upon request. If User A has turned all notifications OFF, the flow diagram of FIG. 5B is not executed for User A.

On the other hand, if User A has turned notification ON for any new post or comment, or for any new thread, or for any individual thread, the loop defined by steps 522-528 is executed whenever the server computer 210 recognizes that a new post or comment has been submitted (step 520). In step 522, a check is made to see if User A should be notified of this post or comment. If the notification has been turned on by User A for the thread containing this new post or comment (i.e., if any of the following applies: (i) User A has turned notification ON for any post; (ii) User A has turned notification ON for new threads and this particular thread is a new thread; and (iii) User A has turned notification ON for this particular thread), the flow proceeds to step 524. A new post is stored in the front of User A's queue of most recent posts (step 526) and a new comment is stored in the front of User A's queue of most recent comments (step 528). The flow then returns to step 520.

If the server computer 210 receives a request from User A for the web page including the image gallery 330 shown in FIG. 3A, the server computer 210 retrieves the first X1 (e.g., X1=5) posts from the queue of most recent posts and the first X2 (e.g., X2=5) from the queue of most recent comments, and prepares the requested web page using the retrieved posts and comments. Because the server computer 210 does not need to execute loop logic and merely retrieves the necessary data from memory, the loading time for the web page that includes the image gallery 330 is accelerated relative to the synchronous loading method.

The method illustrated in the flow diagram of FIG. 5B can be modified to have a single queue of most recent posts and comments to prepare the data necessary to generate the image gallery 330 shown in FIG. 3B. In this example, if the server computer 210 receives a request from User A for the web page including the image gallery 330 shown in FIG. 3B, the server computer 210 retrieves the first X (e.g., X=15) posts from the queue of most recent posts and comments, and prepares the requested web page using the retrieved posts and comments. Because the server computer 210 does not need to execute loop logic and merely retrieves the necessary data from memory, the loading time for the web page that includes the image gallery 330 is accelerated relative to the synchronous loading method.

Figure 6:
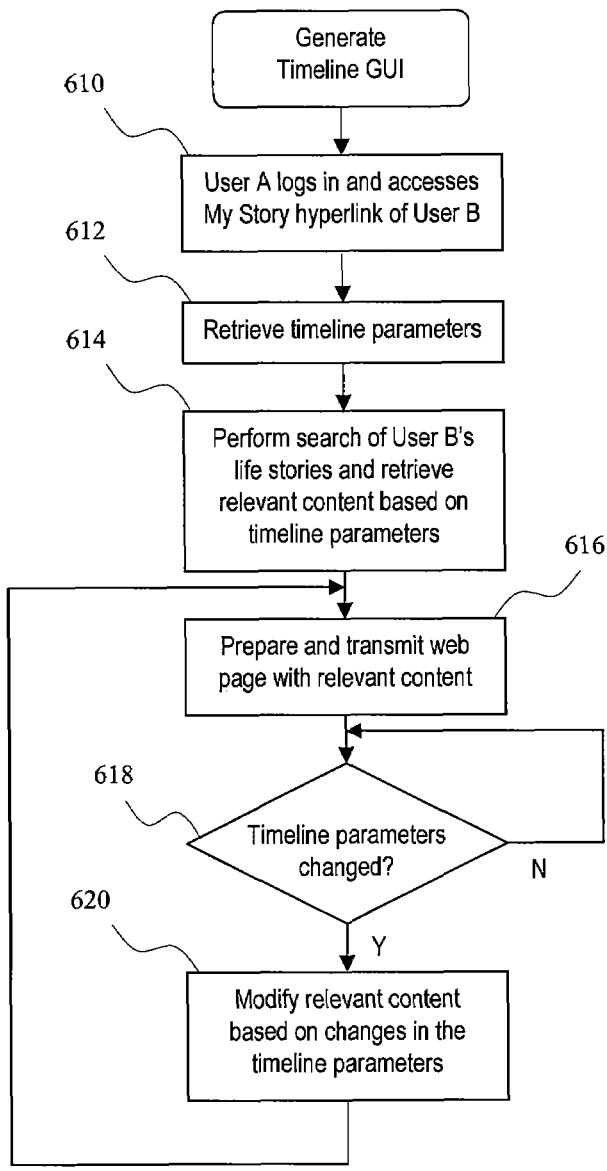
FIG. 6 is a flow diagram that illustrates the method steps carried out by the server computer to generate the GUI according to a second embodiment of the present invention.

FIG. 6 is a flow diagram that illustrates the method steps carried out by the server computer to generate the GUI according to a second embodiment of the present invention. In the example given herein, the timeline section 430 shown in FIG. 4A is generated for User A when User A accesses the My Story web page of User B and modified in accordance with User A's modifications to the date ranges of the timeline.

In step 610, User A logs in and accesses the My Story web page of User B. The default or the most recently used timeline parameters are then retrieved in step 612. The timeline parameters include the beginning date and ending date of the timeline, and the timeline scale, e.g., lifetime, decade, year, month. In step 614, a search is performed on User B's life stories, and the life stories of User B that User A has permission to view and are within the date range specified by the timeline parameters, are retrieved. The retrieved life stories are used to prepare the web page including the timeline section 430 and the web page is transmitted to User A for display (step 616). During preparation of the web page, the server computer 210 determines the display position of each life story in the timeline section 430 relative to the chronology bar 431, so that life stories with dates are aligned vertically with respect to the date printed on or next to the chronology bar 431. Life stories with rough dates, such as month/year or just the year, may have the missing months and/or days pre-assigned by the server computer 210 so that they too can be displayed in the timeline section 430.

A check is made in accordance with step 618 to see if any of the timeline parameters have changed, e.g., by a user's manipulation of any of the GUI controls in the timeline section 430. If there has been a change, the life story set that was used to prepare the web page is modified in accordance with the modifications of the timeline parameters (step 620). For example, if the date range has been expanded, additional life stories are retrieved. If the date range has been shrunk, some of the retrieved life stories are discarded. The flow then returns to step 616, where the modified life story set is used to prepare the web page including the timeline section 430 and the web page is transmitted to User A for display. Steps 618 and 620 are executed as before.

While particular embodiments according to the invention have been illustrated and described above, those skilled in the art understand that the invention can take a variety of forms and embodiments within the scope of the appended claims.

What is claimed is:

1. A method comprising:
generating a plurality of interactive regions, wherein one of the interactive regions displays an image associated with a biographical life story of a first user when a cursor of a pointing device is positioned outside the one of the interactive regions;
generating textual information associated with the biographical life story comprising an excerpt of the biographical life story when the cursor is positioned within the one of the interactive regions;
generating a display of a thread of the biographical life story when the pointing device is actuated while the cursor is positioned within the interactive region, wherein the thread is received from other users about the first user;
producing a first timeline graphic that is displayed with at least two dates to form a range of dates, the thread of the biographical life story posted along the first timeline graphic, wherein certain ones of the other users are permitted to post the thread of the biographical life story along the first timeline graphic within an account of the first user;
receiving a selection of an interactive region within the thread, the interactive region within the thread associated with a life story of one of the other users; and
producing a second timeline graphic along the life story of the one of the other users in response to receiving the selection of the interactive region within the thread,
wherein the method is executed by a processor.

2. The method according to claim 1, further comprising generating another plurality of interactive regions, wherein one of the interactive regions of said another plurality of interactive regions displays an image associated with a user comment regarding the biographical life story of the first user when the cursor is positioned outside the one of the interactive regions of said another plurality of interactive regions, displays the user comment when the cursor is positioned within the one of the interactive regions of said another plurality of interactive regions, and causes a display of an event of the biographical life story of the first user and the user comment when the cursor is positioned within the one of the interactive regions of said another plurality of interactive regions and the pointing device is actuated.

3. The method according to claim 1, wherein the images or the textual information associated with the biographical life story of the first user are displayed from left to right in the order of their posting dates, from the most recent post to the least recent post.

4. The method according to claim 1, wherein the interactive regions are displayed in a plurality of rows with a topmost row being the tallest and associated with a most recent event from the biographical life story of the first user.

5. The method according to claim 2, wherein the user comments are made by the other users to the biographical life story of the first user or are posted by the first user.

6. The method according to claim 1, further comprising generating controls for changing the at least two dates.

7. The method according to claim 6, wherein the interactive regions of the plurality of interactive regions include the images or textual information associated with the thread of the biographical life story of the first user, one or more events of the biographical life story of the first user occurring within the range of dates displayed with the first timeline graphic.

8. The method according to claim 7, wherein the one of the interactive regions of the plurality of interactive regions is positioned with respect to the first timeline graphic in accordance with a date of occurrence of one of the events of the biographical life story of the first user, the one of the events associated with the image or textual information displayed within the one of the interactive regions of the plurality of interactive regions.

9. The method according to claim 6, wherein the biographical life story of the first user corresponds to the life story of the one of the other users.

10. The method according to claim 1, wherein the textual information includes a title of the biographical life story of the first user and a name of a user who posted an event of the biographical life story of the first user.

11. A method for generating a graphical user interface (GUI), comprising:
retrieving parameters for displaying a first timeline graphic, the parameters including a date range having at least two dates;
generating the first timeline graphic based on said date range;
retrieving a thread regarding one or more events of a biographical life story of a first user, the thread regarding the one or more events of the biographical life story associated with said date range and including textual narratives, the textual narratives posted by other users about the first user, the textual narratives posted along the first timeline graphic, wherein certain ones of the other users are permitted to post the thread regarding the one or more events of the biographical life story along the first timeline graphic within an account of the first user; and
generating data for displaying the GUI, the GUI including the first timeline graphic and interactive regions for the one or more events of the biographical life story;
receiving a selection of an interactive region within the thread, the interactive region within the thread associated with a life story of one of the other users; and
producing a second timeline graphic along the life story of the one of the other users in response to receiving the selection of the interactive region within the thread.

12. The method according to claim 11, further comprising the steps of:
receiving inputs that modify said date range; and
generating data for displaying an updated GUI that includes an updated timeline graphic with the modified date range, the updated GUI including interactive regions corresponding to one or more portions of the biographical life story of the first user, the one or more portions of the biographical life story of the first user associated with the modified date range, wherein:
the updated time graphic includes at least two dates and GUI controls used to enable the first user to select a range of dates displayed within the updated timeline graphic, and
one of the interactive regions of the updated GUI is positioned with respect to the updated timeline graphic in accordance with a date of occurrence of an event within the one or more portions of the biographical life story of the first user, the event of the one or more portions represented in the one of the interactive regions of the updated GUI.

13. The method according to claim 11, further comprising:
receiving dates of occurrence of the events of the biographical life story of the first user from the first user; and
assigning the dates to the events of the biographical life story of the first user; and
using the dates when determining display positions of the events of the biographical life story of the first user in relation to the first timeline graphic.

14. The method according to claim 11, wherein one of the interactive regions of the GUI includes:
an image associated with one of the events of the biographical life story of the first user when a cursor of a pointing device is positioned outside the one of the interactive regions of the GUI; and
textual information associated with the one of the events when the cursor is positioned within the one of the interactive regions of the GUI.

15. The method according to claim 11, wherein the data for displaying the GUI is transmitted to the client computing device for display, the data for displaying the GUI further including images and textual information corresponding to a biographical life story of another user.

16. The method according to claim 1, wherein the first user comprises a group of people or a fictional character.

17. The method according to claim 1, wherein the images associated with the biographical life story of the first user are generated as an image gallery in an asynchronous manner.

18. The method according to claim 11, further comprising:
receiving questions from the other users to be posed to the first user about the biographical life story of the first user; and
receiving input from the first user in response to the questions.

19. The method according to claim 11, further comprising sorting the biographical life story of the first user by locations of the events occurring within the biographical life story of the first user.

20. The method according to claim 11, further comprising:
receiving inputs relating to the biographical life story of the first user from the first user, the inputs specifying one of the events of the biographical life story of the first user with a missing date; and
assigning the missing date to the one of the events;
using the assigned date when determining a display position of the one of the events in relation to the first timeline graphic.

21. The method according to claim 11, wherein one of the interactive regions of the GUI includes textual information associated with the biographical life story of the first user and an image associated with the biographical life story of the first user when a cursor of a pointing device is positioned within the one of the interactive regions of the GUI.

22. The method according to claim 1, further comprising generating a scroll bar, wherein the date range changes when the scroll bar is moved.

23. The method according to claim 1, wherein the first timeline graphic includes a chronology bar.

24. The method of claim 1, wherein the thread includes a post and a comment.

25. The method of claim 17, wherein data regarding the images is generated in the asynchronous manner independent of whether a request for a web page including the images is sent.

* * * * *